United States Patent [19]

Sandels

[11] Patent Number: 4,748,767

[45] Date of Patent: Jun. 7, 1988

[54] INSECT (TICK) REMOVER

[76] Inventor: Claes M. C. Sandels, Sandhamnsgatan 21, S-115 40 Stockholm, Sweden

[21] Appl. No.: 26,120

[22] Filed: Mar. 16, 1987

[51] Int. Cl.⁴ .............................................. A01M 1/20
[52] U.S. Cl. .................................... 43/132.1; 43/58
[58] Field of Search .............................. 43/132.1, 58

[56] References Cited

U.S. PATENT DOCUMENTS

| | | | |
|---|---|---|---|
| 4,318,241 | 3/1982 | Fassauer | 43/58 |
| 4,581,845 | 4/1986 | Burkholder et al. | 43/132.1 |
| 4,637,161 | 1/1987 | Turner | 43/132.1 |
| 4,640,044 | 2/1987 | Varnon | 43/132.1 |

Primary Examiner—M. Jordan

[57] ABSTRACT

An arrangement to suffocate a tick (6) or another insect which has stuck on to the skin of a man or an animal. The setup consists of a cup-shaped body (1), which glues on to the skin over the tick (6). A filling injects in the cup-shaped body's interior through one aperture (7) at the same time as the air in the space evacuates through another aperture (8). Owing to this the tick will suffocate so that it releases its hold and can be removed without leaving any remains in the skin. In another shape the setup can be provided with an aperture (8) and a ventilator (15) to merely evacuate the air so that the insect stifles.

4 Claims, 1 Drawing Sheet

INSECT (TICK) REMOVER

BACKGROUND

The invention in question intends an arrangement through which a filling (e g liquid, fat or gas) or only by oxygen evacuation, an insect can be removed, for instance a tick which has clung tight on to the skin of a man or an animal.

The procedures of removing ticks, known before, are either to grease or to put some cooking fat or oil on the tick, hoping that it will suffocate and thereby slip its hold. Even though this method sometimes is successful, it is quite time-consuming to wait for the tick to suffocate and release its hold so that it can be picked off. Besides, it is not always one manages to remove the tick completely.

Consequently, those methods mentioned above, do not always give a satisfying result. In general, that depends on ones failure in suffocating the tick that much it will loosen its grip. The innovation before us originates in the observation of the tick's way of respiration—it does not only breathe with its head, but also with its body, in which it stocks the evacuated blood. It is therefore necessary to surround the tick completely with the filling (the oil, the fat) to make sure it suffocates to that extent it pulls out its blood-sucking organ and perhaps moves, without stifleing to death. With a setup, according to the innovation in question, this can efficiently be brought about on relatively short time.

SUMMARY OF THE INVENTION

The purpose with this invention is thus to provide an arrangement, which achieves oxygen evacuation and restriction in that space where the insect is, so that it suffocates and easily can be removed without causing any damage to the skin.

The setup is thereby distinguished as the following patent claims.

BRIEF DESCRIPTION OF THE DRAWING

With reference to the enclosed drawing, the innovation will be further described, where.

The arrangement as per the invention will below be further described in a shape with reference to FIGS. 1 and 2.

BRIEF DESCRIPTION OF THE PREFERRED EMBODIMENTS

Figure 1:
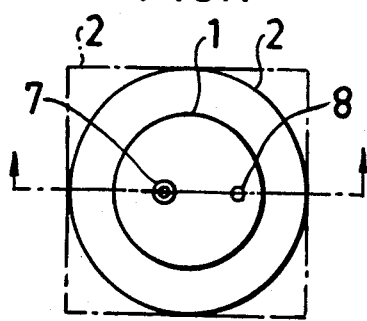
FIG. 1 shows the setup as per the invention, seen from above.

According to FIG. 1, which shows the setup seen from above, it consists of a cup-shaped envelopement (1), which lower part is shaped with a flange (2), which in this case is circular, but it can also be shaped quadratic or in any suitable form, e g elliptical or reactangular. The upper area of the cup-shaped part is provided with two apertures (7) and (8) to be able to insert a filling into the interior of the cup-shaped part (e g cooking oil, gas or the like), which completely shall enclose the insect. The setup will be placed upon the skin of the animal or the person, so that the tick encircles in the cup-shaped part (1) and the flange bears on the skin. The flange (2) should therefore on its underside be supplied with something adhesive, similar to what is used for e g plaster or known adhesive suspension setups. When the arrangement has been conveyed to its place, the filling will be injected through the aperture (7), at which the existing oxygen, inside the envelopement, will be evacuated via the aperture (8). The filling will accordingly totally fill the interior of the cup-shaped part and thus completely enclose the insect.

Figure 2:
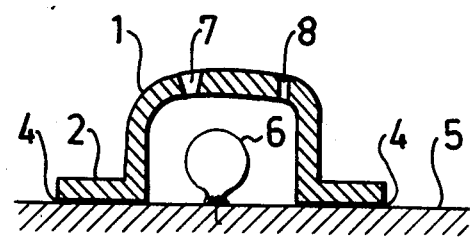
FIG. 2 shows a cross-section of the invention according to FIG. 1.
Figure 3:
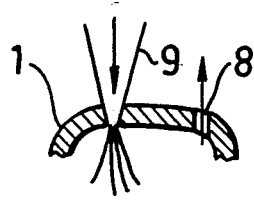
FIG. 3 shows a magnified detail of the setup as per FIG. 1 and FIG. 2.

In FIG. 2 the cup-shaped part (1) and the flange (2) appear more distinctly. The adhesive medium is here marked (4), and the insect, in this case a tick, which has clung tight on to the skin (5) is represented with (6). The aperture (7) can, as it appears from FIG. 2, suitably be shaped with a funnelled cross-section to facilitate the introducing of a pipette (9) or the like, when injecting the filling into the interior of cup-shaped part (1), see FIG. 3. Further has the aperture (8), which evacuates the oxygen in the interior, been placed at the bent section of the cup-shaped part, whereby a leakage of the injected filling, through the aperture, will be obstructed. The aperture (7) should at its bottom be provided with a simple ventilator, e g through riveting, to prevent the filling from leaking.

It is of course possible to make the cup-shaped part, as well as the flange, with another cross-section, than the one shown in FIGS. 1 and 2. The cup-shaped part can e g be completely bent and shaped either as a halfsphere or a calotte or even; the part (1) can have a rectangular cross-section. Even the flange (2) can have, as mentioned above, several different shapes, so that a good contact surface will be received against the skin.

Figure 4:
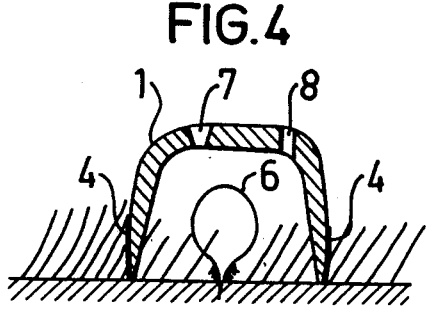
FIG. 4 shows another shape of the arrangement as per the invention in cross-section.

The shape, as per FIG. 4, which shows a cross-section of the cup-shaped part (1), the setup is intended for furred animals. In this shape the flange has been taken away, and the adhesive medium has been placed on the exterior of the cup-shaped part, at its bottom. Furthermore, this part is made with sharp brims to be able to penetrate into the fur of the animal and get in contact with the skin. The adhesive medium will then stick to the hairs of the fur of the animal, which secures that the setup (1) will be held in position above the insect (6). As in the models according to FIGS. 1 and 2, the filling is injected through the aperture (7) at which the air evacuates through the aperture (8).

Figure 5:
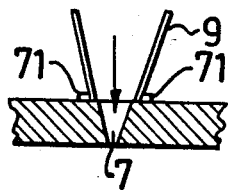
FIG. 5 shows the same detail as FIG. 3 but in another design.

In FIG. 5 the cup-shaped part's upper section, at the aperture (7), is shown in magnification. Here at the top, is a ring around the aperture (7) made. The circle has been formed by an adjacent annular elevation (71), in the figure shown in cross-section. When injecting the filling, the opening of the spout will be placed so that its brims presses in the elevated fringe (71), whereby the spout will be fixed and easily held in position, when filling.

Figure 6:
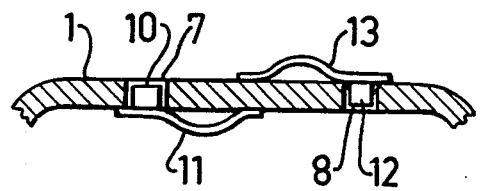
FIG. 6 also shows the same detail as FIG. 3, but in another model with ventilators.

In FIG. 6 it is shown how two ventilator for each aperture (7) and (8) can be arranged. Each ventilator is composed of a cylindrical body (10) and (12), which at the rest position of the ventilator, penetrates in the apertures (7) and (8). The bodies will then be held in position through elastic arms (11) and (13), which by e g riveting or welding are stuck to the part (1) at an adequate distance from each aperture (7) and (8).

When the mouth of the tube (9) will be put in the aperture (7) the body (10) will elasticly move downwards and allow injecting of the filling. At the same time the encircled air will exert a pressure on the body (12) and as filling will be injected, the air pressure will increase until the encircled air will leak out through the opened ventilator (12) and (13).

Figure 8:
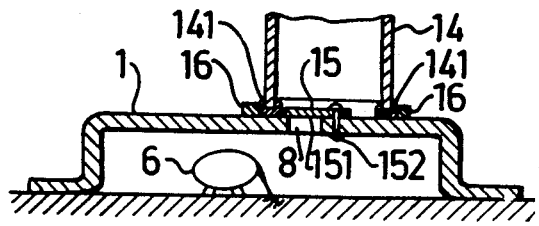
FIG. 8 shows another shape of the setup as per the invention.

In the shape according to FIG. 8, no filling medium is used to partly suffocate the insect (6), instead the air evacuates inside the envelopement (1), partly or as much as possible, so that a desired effect is obtained. For this purpose there is a suction with a pipe (14) and a ventilator (15). The ventilator consists of a quite soft material. The lid covers thereby the aperture (8) of the capsule or the envelopement (1). When the pressure decreases in the suction, the air pressure in the capsule will be higher, something which presses the lid (151) upwards for evacuation of air. This will go on until equalization of pressure has happened between the capsule (1) and the suction (14). When that has occured, the lid (151) will again obstruct the aperture (8), as that is the lid's rest position. When the suction removes, the air pressure will strongly press the lid (151) against the surface of the capsule (1). The lack of oxygen inside the capsule (1), results in, in this shown case, the tick pulls out its trunk, wanted to escape to another place. To fix the pipe of the suction in its position during evacuation, an annular elevation (16) is suitably made round the aperture (8). Furthermore, the lower part of the suction-pipe (14) could be provided with a suction-hood (141) which in the pipe's position bears on the inside of the elevation (16).

Figure 7:
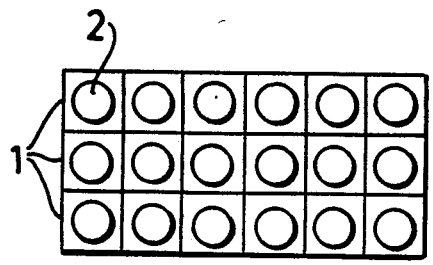
FIG. 7 shows a collection of setups according to the invention.

The setup which is simple in its construction, can consist of plastic and be produced in maps or sets, as shown in FIG. 7. (Compare e g with packages for medical tablets or the like). This makes it possible to use several units in an easy and efficient way. The filling may possibly be enclosed with one or several maps of setups, e g in form of a separate tube.

I claim:

1. An arrangement to at least, partly suffocate and thereby remove an insect, particularly a tick, which has clung tight on the skin of a man or an animal, including a cup-shaped body (1), which inner cup-shaped surface completely covers the insect and is provided with adhesive medium (4) to hold it in its position against the skin, characterized by that the cup-shaped body, on the surface, faced against the skin, is provided with at least two apertures (7,8) of which one aperture (7) is adapted so that a filling can be injected into the interior of the body, and the other aperture (8) is such, that when introducing the filling, the enclosed air evacuates, at which, ventilators (10,11 and 12,13) are arranged at the apertures (7,8) mentioned before, to prevent the filling to leak out, respectively the air to enter the interior of the cup-shaped body.

2. An arrangement as per patent claim 1, characterized by that the cup-shaped body (1) at its lower part is provided by a flange (2), and that its surface underneath is provided with that adhesive medium mentioned.

3. An arrangement as per patent claim 1, characterized by that the cup-shaped body at its bottom is shaped as a narrowing sharp edge, intended to penetrate through hair and fur when placing it.

4. An arrangement as per patent claim 1, characterized by that the mentioned cup-shaped body (1) is made of a transparent material, for observation of the insect.

* * * * *